(12) United States Patent
Connolly et al.

(10) Patent No.: US 8,116,956 B2
(45) Date of Patent: Feb. 14, 2012

(54) FAULT TOLERANT CLUTCH ACTUATOR

(75) Inventors: Thomas R. Connolly, Portage, MI (US); Mark E. Hope, Marshall, MI (US)

(73) Assignee: Eaton Corporation, Cleveland, OH (US)

( * ) Notice: Subject to any disclaimer, the term of this patent is extended or adjusted under 35 U.S.C. 154(b) by 734 days.

(21) Appl. No.: 12/165,802

(22) Filed: Jul. 1, 2008

(65) Prior Publication Data

US 2010/0000835 A1    Jan. 7, 2010

(51) Int. Cl.
*G06F 7/00* (2006.01)
*G06F 17/00* (2006.01)

(52) U.S. Cl. .......... 701/67; 701/29; 701/30; 701/31; 192/31; 192/69.62; 192/69.71; 477/70; 477/77; 477/79; 477/166; 477/174; 477/175

(58) Field of Classification Search ............ 701/29, 701/30, 31, 67; 477/5, 6, 8, 13, 39, 70, 77, 477/78, 79, 166, 169, 174, 175, 176, 180, 477/181; 192/30 R, 31, 32, 38, 40, 41 R, 192/69.62, 69.71
See application file for complete search history.

(56) References Cited

U.S. PATENT DOCUMENTS

| | | | |
|---|---|---|---|
| 4,081,065 A | 3/1978 | Smyth et al. | |
| 4,171,029 A * | 10/1979 | Beale | 180/54.1 |
| 4,361,060 A | 11/1982 | Smyth | |
| 4,527,447 A | 7/1985 | Richards | |
| 4,638,898 A | 1/1987 | Braun | |
| 4,646,891 A | 3/1987 | Braun | |
| 4,648,290 A | 3/1987 | Dunkley et al. | |
| 4,714,144 A | 12/1987 | Speranza | |
| 4,873,637 A | 10/1989 | Braun | |
| 4,899,858 A | 2/1990 | Cote et al. | |
| 4,947,681 A | 8/1990 | Young | |
| 5,052,246 A * | 10/1991 | Yamaguchi | 477/155 |
| 5,275,267 A | 1/1994 | Slicker | |
| 5,293,316 A | 3/1994 | Slicker | |
| 5,314,050 A | 5/1994 | Slicker et al. | |
| 5,316,116 A | 5/1994 | Slicker et al. | |
| 5,337,874 A | 8/1994 | Oltean et al. | |
| 5,393,274 A | 2/1995 | Smedley | |
| 6,012,538 A * | 1/2000 | Sonobe et al. | 180/220 |
| 6,022,295 A | 2/2000 | Liu | |
| 6,077,186 A | 6/2000 | Kojima et al. | |
| 6,258,008 B1 | 7/2001 | Tabata et al. | |
| 6,453,222 B1 | 9/2002 | Lasson et al. | |
| 6,988,604 B2 | 1/2006 | Kelley, Jr. | |
| 7,104,920 B2 | 9/2006 | Beaty et al. | |
| 7,402,123 B2 * | 7/2008 | Kobayashi et al. | 477/75 |
| 7,708,095 B2 * | 5/2010 | Hirata | 180/65.275 |
| 7,860,629 B2 * | 12/2010 | Schweizer et al. | 701/51 |
| 2006/0037424 A1 * | 2/2006 | Pickering et al. | 74/473.3 |

* cited by examiner

*Primary Examiner* — Hussein Elchanti
*Assistant Examiner* — Rami Khatib
(74) *Attorney, Agent, or Firm* — Rader, Fishman & Grauer PLLC

(57) ABSTRACT

A method of engaging a clutch within a drive train may include detecting a fault in a clutch engagement data link, selecting an alternative clutch control logic, detecting a value indicative of a rotational speed of a first portion of the clutch and moving a second portion of the clutch based upon the detected value.

20 Claims, 5 Drawing Sheets

FAULT TOLERANT CLUTCH ACTUATOR

TECHNICAL FIELD

The disclosure generally relates to vehicular clutches and specifically to operating a vehicle during a fault of a vehicular clutch component.

BACKGROUND

Vehicular automated mechanical transmission systems comprising a multiple-speed mechanical transmission drivingly connected to a fuel-controlled engine by means of an automatically actuated vehicle master friction clutch are well known in the prior art, as may be seen by reference to U.S. Pat. Nos. 4,081,065; 4,361,060; 4,527,447; 4,638,898; 4,648,290; 4,714,144; 4,873,637; 5,275,267; 5,293,316; 5,314,050 and 5,316,116, the disclosures of which are incorporated herein by reference.

To improve the controllability and responsiveness of the prior art master clutch control systems, one may determine a clutch control parameter value, such as a clutch actuator position, which corresponds to the "torque transfer touch point" or "point of incipient engagement" of the clutch, i.e., that point or position during engagement of the master clutch at which the master clutch just began to transmit torque. The clutch torque transfer touch point may be determined or calibrated during a system startup routine and subject to updating during ongoing vehicle operations, as disclosed in U.S. Pat. Nos. 5,393,274 and 6,022,295, the disclosures of which are incorporated herein by reference.

During a controlled master clutch engagement, a moveable clutch plate of the master clutch may be moved rapidly from its disengaged position toward a fixed clutch plate (and may compress a number of clutch disks between the plates) to a point just prior to the torque transfer touch point, and then further moved toward the fixed clutch plate in a controlled, modulated manner according to the applicable clutch control logic. Examples of such clutch control logic may be seen by reference to U.S. Pat. Nos. 4,646,891; 4,899,858 and 5,337,874, the disclosures of which are incorporated herein by reference. One reason for not maintaining the moveable clutch plate and the fixed clutch plate in a clutch position just prior to the torque transfer touch point is that this clutch position may result in an inadvertent transfer of torque between the moveable clutch plate and the fixed clutch plate and may result in a frictional shear (especially in a wet clutch) as the plates and/or friction disks of a clutch rotate within a sufficiently close axial distance to undesirably heat the clutch. Heating of a clutch may reduce clutch life, increase wear, and reduce the amount of torque that may be transferred therethrough.

Typically, the parameters used to engage the clutch automatically include inputs such as throttle pedal position, engine output shaft rotational speed, and transmission input shaft rotational speed. In the event of a fault in the control system for the clutch, the system may not be able to operate the clutch. This failure may result in undesirable operations of the vehicle, or complete unavailability of the vehicle.

BRIEF DESCRIPTION OF THE DRAWINGS

Referring now to the drawings, illustrative exemplary embodiments are shown in detail. Although the drawings represent some exemplary embodiments, the drawings are not necessarily to scale and certain features may be exaggerated, removed, or partially sectioned to better illustrate and explain the present invention. Further, the exemplary embodiments set forth herein are exemplary and are not intended to be exhaustive or otherwise limit or restrict the claims to the precise forms and configurations shown in the drawings and disclosed in the following detailed description.

FIG. 3 is a partial sectional view taken along line 3-3 of FIG. 2.

DETAILED DESCRIPTION

Figure 1:
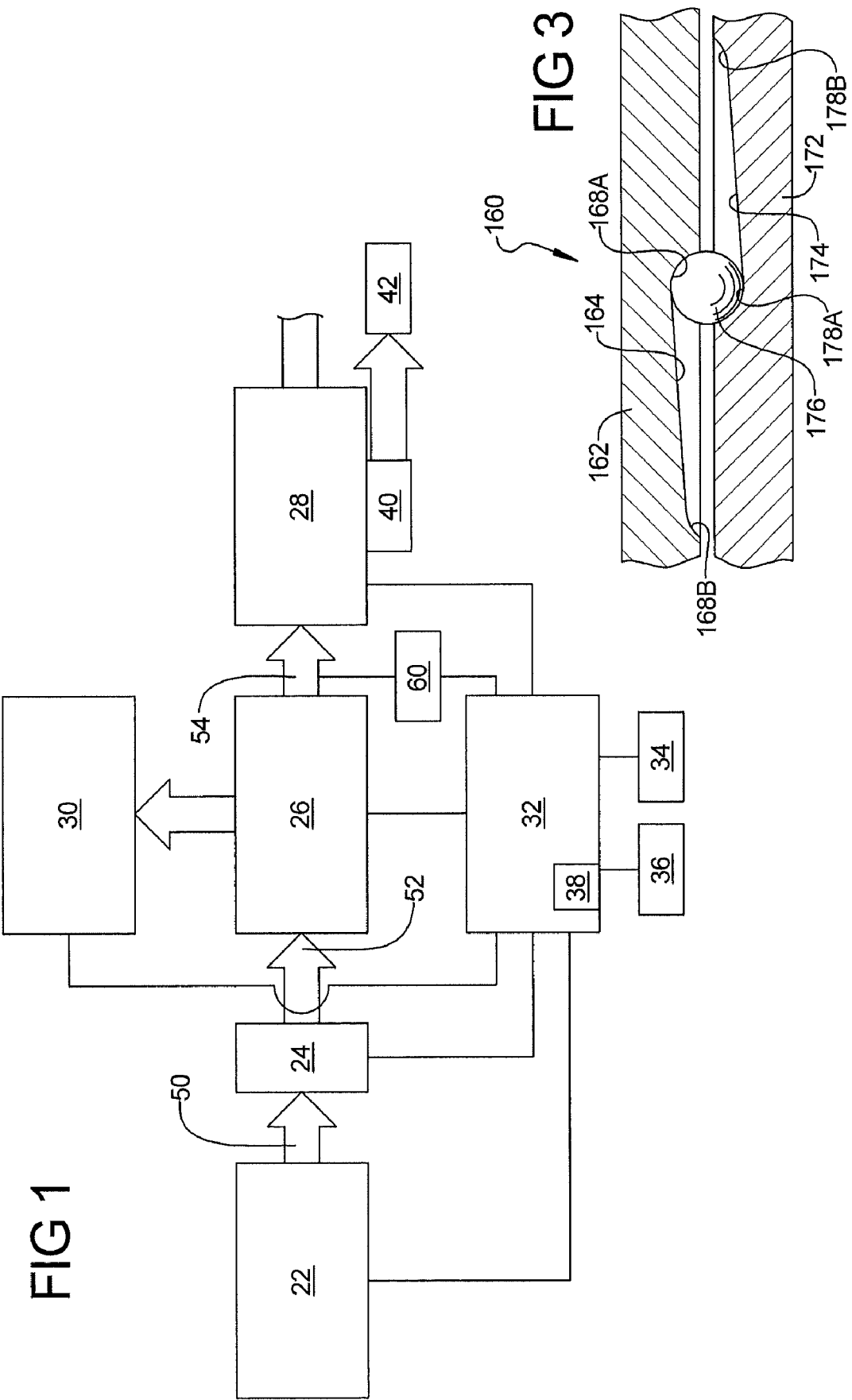
FIG. 1 is a schematic of a hybrid vehicle drive train system, according to an exemplary embodiment.

FIG. 1 schematically illustrates a vehicle 18 having a hybrid vehicle powertrain system 20. The hybrid vehicle powertrain system 20 includes an internal combustion engine 22, a clutch assembly 24, a motor 26, a transmission 28, a battery portion 30, a controller 32, a user interface 34, and an ignition 36. Engine 22 and motor 26 are examples of prime movers for vehicle 18. The system 20 may also include a decibel meter 40, a power take off (PTO) (not shown) and a PTO powered device (not shown). According to one exemplary approach, the motor 26 is an electric motor configured to rotate at least a portion of the clutch assembly 24. The controller 32 may be a processor or microprocessor configured for detecting parameters and providing outputs as discussed in greater detail herein. The ignition 36 may be used for starting the system 20, although the controller 32 may be operational and perform functions even with the ignition in an off configuration.

The controller 32 may be electronically and microprocessor-controlled and for providing output information to an electronic data link DL, preferably conforming to the industry standard SAE J1939 or a comparable protocol. A data link, conforming to the SAE J1939 protocol or a comparable protocol, transmits information by which information associated with the prime mover and related components. Controller 32 may be a single controller or one of a series of interconnected controllers. Although not shown, controller 32 may be of general construction having a central processing unit (CPU), various co-processors, a read only memory (ROM), a random access memory (RAM), an input for selectively receiving data via a data link from various vehicle components including the prime movers and related components, an output for selectively transmitting command output signals, and a bi-directional bus (such as a CAN bus) interconnecting the components The engine 22 includes an engine output shaft 50 and the motor 26 includes a motor input shaft 52 and the transmission 28 includes a transmission input shaft 54. The system 20 also includes a engine output shaft speed sensor 60. Generally, the engine output shaft speed sensor 60 will detect movement of the engine output shaft 50.

Figure 2:
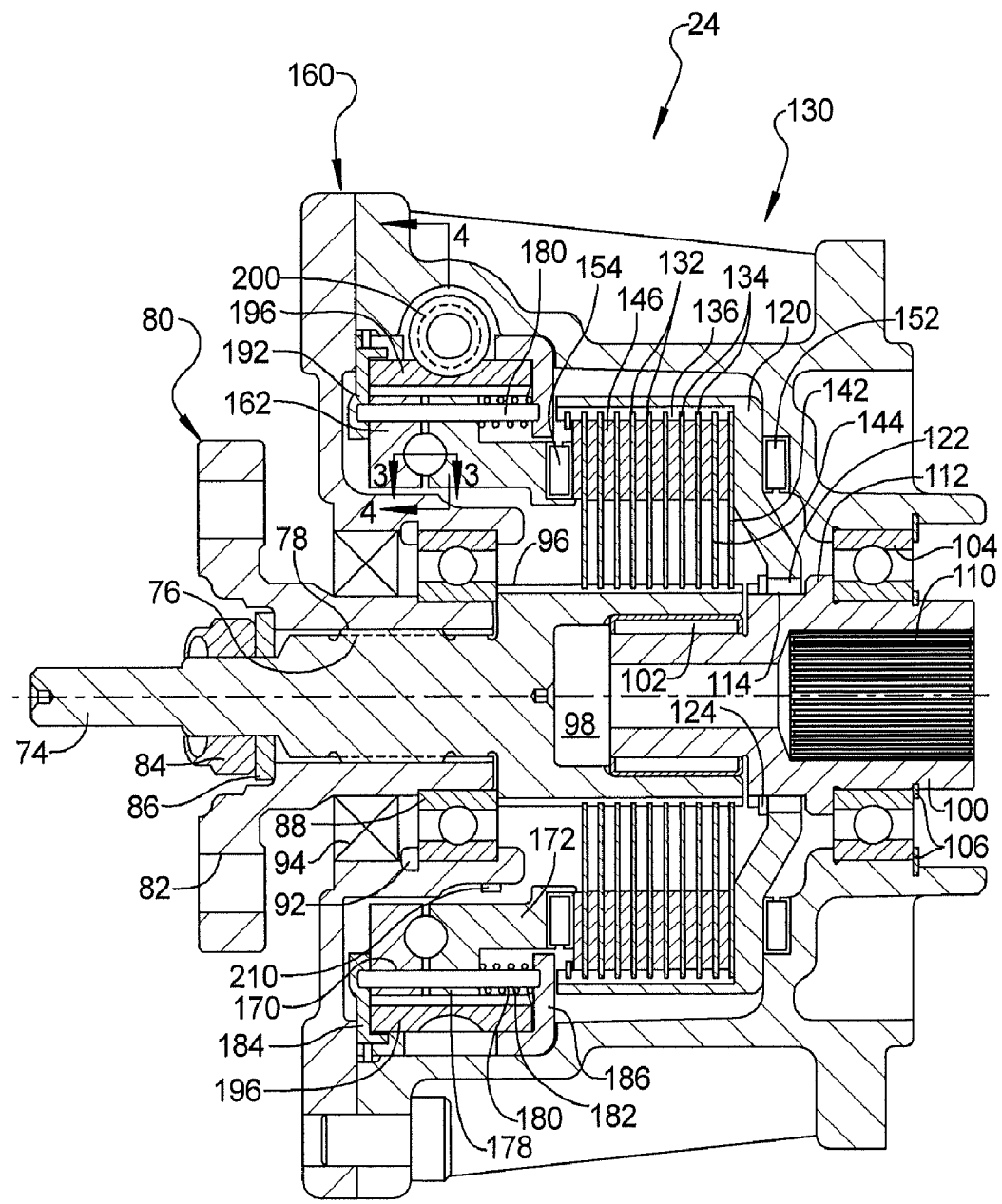
FIG. 2 is a partial sectional view of a clutch, according to an exemplary embodiment.

Referring now to FIG. 2, the clutch assembly 24 includes a preferably cast, two component housing 72 which includes various apertures, recesses, shoulders, and the like which receive, position and support various components and sub assemblies of the clutch assembly 24. An input shaft 74 includes an enlarged diameter threaded portion having external or male splines 76 which are complementary to and engaged by internal female splines 78 formed on the interior portion of an input flange 80. The input flange 80 includes through axial passageways 82 which may receive fasteners or components, for example, of the universal joint 34, illustrated in FIG. 1. The input flange 80 is secured to and retained upon the input shaft 74 by a threaded fastener such as a nut 84 and a flat washer 86. The input shaft 74 and the flange 80 are positioned and supported by an antifriction bearing such as a ball bearing assembly 88 which is retained within the housing by a snap ring 92. An oil seal 94 extends between the exterior surface of the input flange 80 and the housing 72 and inhibits the passage of clutch fluid from within the housing 72 and contaminants into the housing 72. The input shaft 74 includes a plurality of external or male splines or gear teeth 96.

The input shaft 74 also includes a counterbore 98 which receives a portion of an output shaft 100. A reduced diameter portion of the output shaft 100 which is received within the counterbore 98 supports and is supported by a roller bearing assembly 102. An antifriction bearing such as a roller bearing assembly 104 freely rotatably supports the output shaft 100 within the housing 72. The ball bearing assembly 104 and the output shaft 100 are axially positioned and retained by a pair of snap rings 106. The output shaft 100 includes a set of internal or female splines 110 which may engage and drive components (not illustrated) within the rear differential assembly 36, illustrated in FIG. 1.

The output shaft 100 defines a shoulder 112 between the ball bearing assembly 104 and a region of external or male splines or gear teeth 114. An output bell housing, or axially fixed plate, 120 includes a smaller diameter region of internal or female splines 122, which are complementary to and engage the male splines 114 on the output shaft 100. Thus, the output bell housing 120 rotates with the output shaft 100. A snap ring 124 maintains the output bell housing 120 in a proper axial position on the output shaft 100 adjacent the shoulder 112 and engaged with the male splines 114.

The clutch assembly 24 also includes a multiple plate friction clutch pack assembly 130. The friction clutch pack assembly 130 includes a first plurality of larger diameter friction clutch plates or discs 132 having a plurality of male or external splines 134 which are complementary to and engage internal or female splines 136 on the inner surface of the output bell housing 120. Thus, the first plurality of clutch plates or discs 132 rotates with the output bell housing 120 and the output shaft 100. Interleaved with the first plurality of clutch plates 132 is a second plurality of smaller diameter friction clutch plates or discs 142. The second plurality of smaller diameter friction clutch plates or discs 142 includes internal or female splines 144 which are complementary to and engage the male splines 96 on the input shaft 74. Thus, the second plurality of clutch plates or discs 142 rotates with the input shaft 74. It will be appreciated that appropriate, adjacent surfaces of the friction clutch plates or discs 132 and 142 include clutch paper or friction material 146, which provides suitable frictional coupling between the clutch plates or discs 132 and 142 when they are compressed.

A first roller thrust bearing assembly 152 is disposed between the output bell housing 120 and the housing 72 and a second roller thrust bearing assembly 154 is disposed between the opposite end of the friction clutch pack 130 and a ball ramp operator assembly 160.

Referring now to FIGS. 1, 2, 3 and 4, an exemplary embodiment of an electronic clutch actuator (ECA) 160 is illustrated. In the exemplary embodiment, the ECA includes a ball ramp operator assembly that includes a first, rotatable member 162 which includes a plurality of unidirectionally ramped recesses 164 defining a deep cupped end 168A and a shallow cupped end 168B. In one exemplary approach there may be three recesses 164. The first rotatable member 162 also includes a plurality of arcuate slots 170. Adjacent the first rotatable member 162 is a second, non-rotatable, axially moveable member, or axially moveable plate, 172. The second, axially moveable member 172 includes a like plurality of, again, unidirectionally ramped recesses 174 similarly having a deep cupped end 178A and a shallow cupped end 178B. In one exemplary approach there may be three such recesses 174. In the relaxed position of the clutch assembly 70, the deep cupped ends 168A and 178A of the first and second members 162 and 172, respectively, are adjacent one another and receive load transferring members, such as ball bearings, 176. The cupped ends 168A, 168B, 178A and 178B of the ramped recesses 164 and 174 ensure retention of the load transferring members 176.

The second, axially moveable member 172 includes a plurality of through holes or apertures 178 that may receive a like plurality of register pins 180 extending through the arcuate slots 170 of the first member 162. Disposed about the register pins 180 along their portions extending beyond the second member 172 are compression springs 182, which provide a biasing or restoring force which urges the second member 172 to the left, as illustrated in FIG. 2, to relax compression of the friction clutch pack assembly 130. The ends of the register pins are received and retained within stationary circular frames 184 and 186. Thus, the register pins 180 are stationary and inhibit rotary motion of the second moveable member 172 while permitting it to axially translate.

It will be appreciated that the recesses 164 and 174 and the load transferring members 176 may be replaced with other analogous mechanical elements, which cause axial displacement of the second, moveable member 172 in response to relative rotation therebetween. For example, tapered rollers disposed in complementarily configured conical helices or cam plates having a plurality of opposed, complementary oblique surfaces may be utilized.

An important design consideration of the recesses 164 and 174 and the load transferring members 176 is that their geometry and the overall design and clearances of the ECA 160 ensure that the clutch assembly 70 is not self-engaging. The clutch assembly 24 must not self-engage, but rather must be capable of modulating clamping of the friction clutch pack assembly 130 in direct, proportional response to the signal provided by the controller or controller 32.

Figure 4:
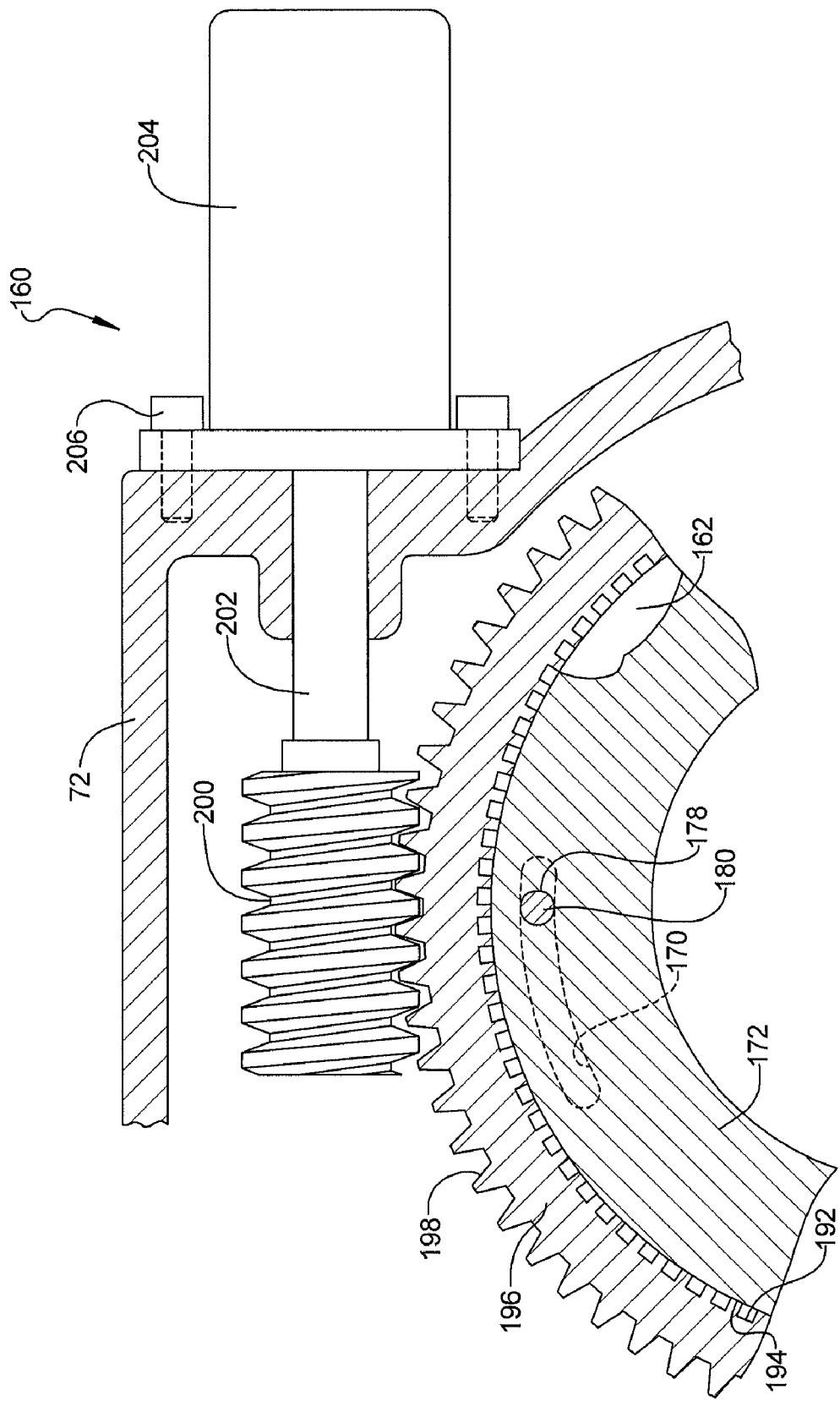
FIG. 4 is a partial sectional view taken along line 4-4 of FIG. 2.

Referring now to FIGS. 2 and 4, the outer periphery of the first member 162 includes male or external splines or gear teeth 192, which are complementary to and engage internal or female splines or gear teeth 194 on an annular drive ring or collar 196. The annular drive ring or collar 196 includes external gear teeth 198, which are engaged and driven by a worm gear 200. The worm gear 200 is secured to a driveshaft 202, which is driven by a bi-directional clutch engaging motor 204 which is, in turn, secured to the housing 72 by a plurality of threaded fasteners 206. The bi-directional electric motor is driven by an output of the controller 32.

The ECA 160 may also include a memory 220 and a control portion 222 that may communicate with the sensor 60 to "read" the value detected by the sensor 60. Collectively, the members 162, 172, the balls 176, the collar 196, and the motor 204 are included in the ECA 160, although other types of clutch actuators may be used in other embodiments.

In operation, as the driveshaft 202 of the bi-directional clutch engaging motor 204 rotates, typically upon a command from the controller 32, the ring gear 196 rotates about its axis at a greatly reduced speed. As it rotates, it rotates the first, rotatable member 162, thereby causing the ball bearings 176 to roll up the ramps 164 and 174 and translate the second member 172 toward the friction clutch pack assembly 130 and the axially fixed plate 120. Compression of the friction clutch pack assembly 130 between the second member 172 and the axially fixed plate 120 transfers torque from the input shaft 74 to the output shaft 100 (i.e. the clutch 24 is engaged). It will be appreciated that because of the anti-backdrive characteristics of the worm gear 200 and the teeth 198 of the ring gear 196, cessation of motion of the clutch engaging motor 204 will result in maintenance of the compression of the friction clutch pack 130 and maintenance of the level of torque throughout.

During clutch 24 engagement, the clutch position, or relative position between the second member 172 and the axially fixed plate 120 may be monitored by a moveable plate axial position detector 210 (FIG. 2) that may be operably connected to the controller 32. The moveable plate axial position detector 210 is positioned within the clutch 24 so as to detect the position of the moveable clutch plate 172 during clutch engagement. That is, the detector 210 may detect the movement of a portion of the clutch 24 between a disengaged position and an engaged position and send a value representative of the position of the portion to the controller 32 or other component.

Typically during engagement of the clutch 24, the controller 32 will rotate the driveshaft 202 of the clutch engaging motor 204 at a high rate of rotational speed until just prior to the torque transfer touch point (the clutch position where the compression of the friction clutch pack assembly 130 between the second member 172 and the axially fixed plate 120 will begin to transfer torque from the input shaft 74 to the output shaft 100). Then the controller 32 will rotate the driveshaft 202 of the clutch engaging motor 204 at a lower rate of rotational speed so as to compress the friction clutch pack assembly 130 between the second member 172 and the axially fixed plate 120 in a controlled manner that will result in a desirable rate of clutch engagement. In this manner, the clutch 24 may be engaged in a controlled manner to prevent an undesired "jerk" engagement while not delaying the time required for an engagement.

As the clutch engaging motor 204 is commanded to rotate in the opposite direction by the controller 32 or other controller, the ring gear 96 and first member 162 likewise rotate in a direction which releases pressure on the friction clutch pack assembly 130, such pressure release aided by the compression springs 182, which urge the second member 172 to the left, to the relaxed position illustrated in FIGS. 2 and 3 (i.e. the clutch 24 is disengaged). Accordingly, the current applied to the clutch engaging motor 204 will engage or disengage the clutch 24.

The input shaft 74 of the clutch 24 is coupled for rotation with the clutch input shaft 50 (FIG. 1), and the motor input shaft 52 (FIG. 1) is coupled for rotation with the clutch output shaft 100.

Figure 5:
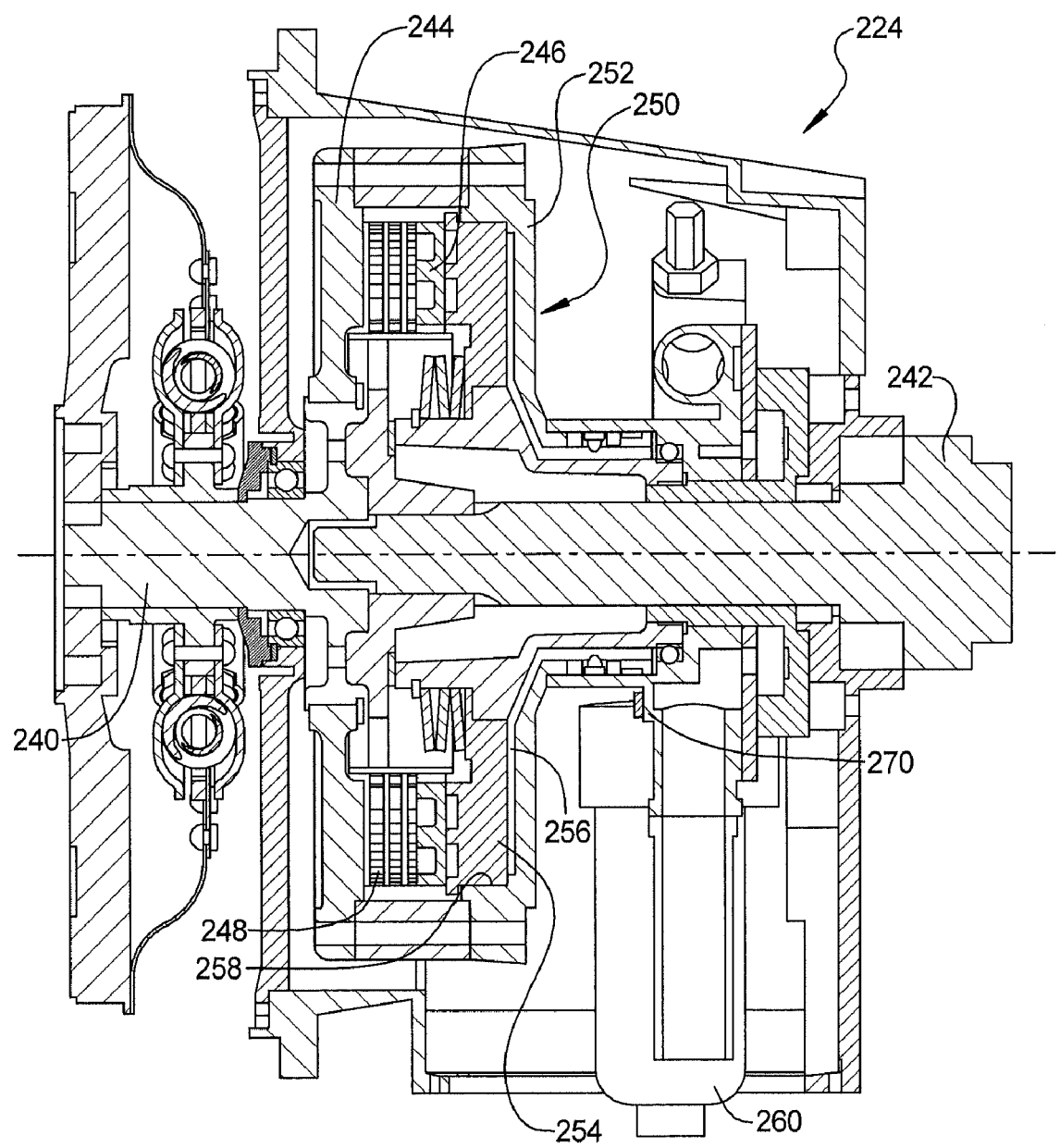
FIG. 5 is a partial sectional view of a clutch, according to an exemplary embodiment.

As best seen in FIG. 5, the clutch assembly 24 is illustrated in an alternative exemplary embodiment as a hydraulically actuated clutch 224. The clutch 224 includes an input portion 240, an output portion 242, a fixed plate 244, a moveable plate 246, and at least one friction disk 248. In the exemplary illustration, the clutch 224 is an "automatic clutch" that is operated by the controller 32 to control engagement and disengagement. That is, the controller 32 will control movement of the moveable plate 246 relative to the fixed plate 244. Further, the moveable plate 246 is illustrated adjacent a piston assembly 250, although other assemblies (such as a ball ramp) for axially moving the moveable plate 246 relative to the fixed plate 244 may be used. The input portion 240 is operably coupled to the output shaft of the engine 22, and the output portion 242

The piston assembly 250 includes a piston housing 252, a piston 254, and a piston chamber 256. A pressure supply system, partially illustrated at 260, for supplying a pressurized fluid to the piston chamber 256. The piston housing 252 includes a generally annular piston cylinder portion 258 to permit the piston 256 to move axially relative thereto. The system 260 may supply in a pulse-width fashion, for example, to control the axial distance of the moveable plate 246 relative to the fixed plate 244.

During clutch 224 engagement, the clutch position, or relative position between the moveable plate 246 and the axially fixed plate 244 may be monitored by a moveable plate axial position detector 270 that is operably connected to the controller 32. The moveable plate axial position detector 270 is positioned within the clutch 224 so as to detect the position of the moveable plate 246 during clutch engagement. Accordingly, the moveable plate 246 may be moved relative to the axially fixed plate 244 by the controller 32 as the controller 32 monitors and detects their relative position.

Figure 6:
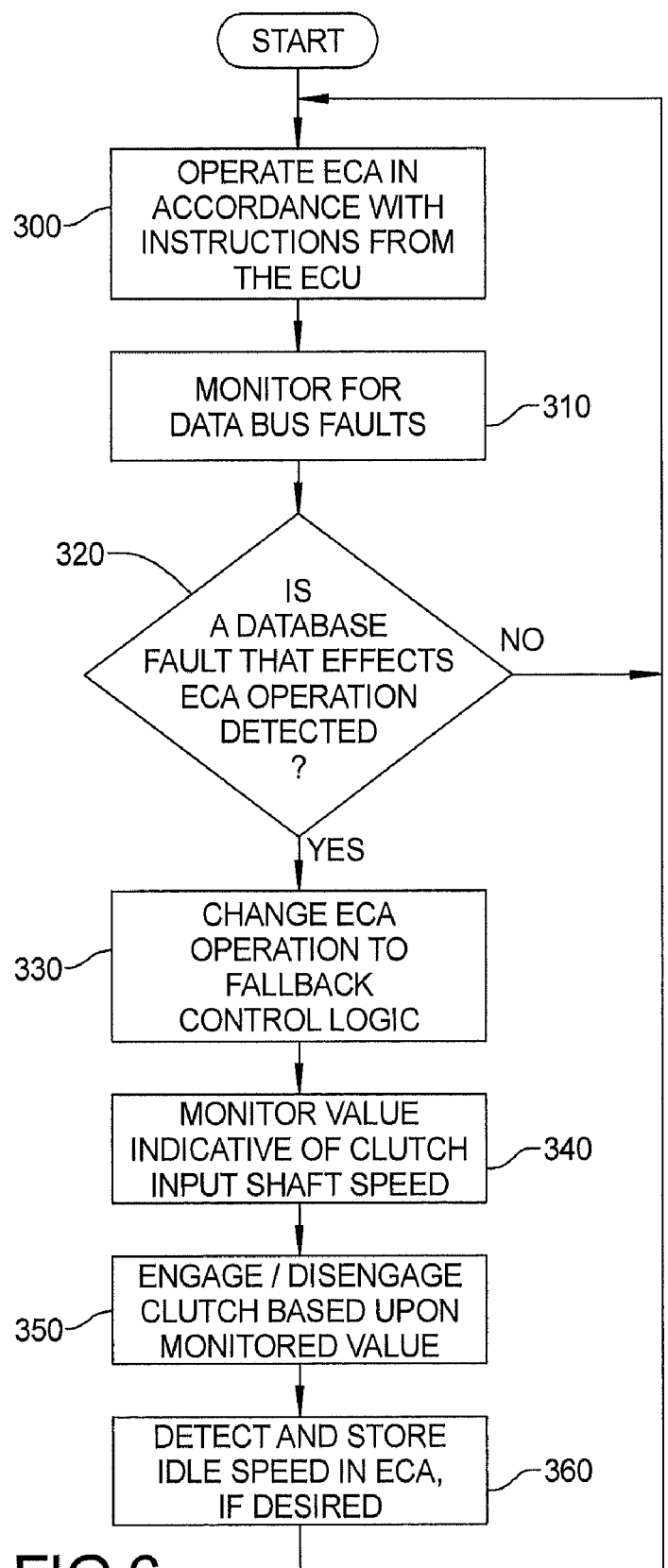
FIG. 6 is a flow chart illustrating steps of a method according to an exemplary embodiment.

FIG. 6 illustrates one exemplary embodiment of operation of the system 20. In step 300, an ECU, such as the controller 32, may operate the clutch by controlling the ECA 160 to engage and disengage the clutch 24 based upon inputs such as throttle pedal position, engine output shaft 50 rotational speed, and transmission input shaft 52 rotational speed. The method may then proceed to step 310.

In step 310, the system 20 monitors for faults that may prevent the ECU 32 from controlling the ECA 160. These faults may include inconsistencies in the redundant data transmitted through a CAN bus, or other fault identifying a failure of the CAN bus to properly control the ECA 160. The detection may include detecting the absence of an expected signal or input. The method may then proceed to step 320.

In step 320, a determination is made as to whether a fault is detected. If a fault is detected, the method may then proceed to step 330. If a fault is not detected, the method may then return to step 300.

In step 330, the operation of the ECA 160 may change to a "fallback control logic" where the ECU 32 may cease to control the ECA 160 as in step 300. For the operation of step 330, any component of the system 20 capable of performing the required actions may be used, although the discussion herein will present an exemplary embodiment where the ECA 160 may perform the functions of steps 340 and 350. The method may then proceed to step 340.

In step 340, the ECA 160 will monitor the sensor 60 to determine a value representative of the rotational speed of the engine output shaft 50. In this exemplary embodiment, the ECA 160 has a value for the idle speed of the engine 22 stored in a memory portion. The method may then proceed to step 350.

In step 350, the ECA 160 may engage the clutch 24 based upon the value representative of the rotational speed of the engine output shaft 50. In one exemplary embodiment, for example, if the engine 22 idle speed is 1000 revolutions per minute (rpm), the controller may have a predetermined range, such as 1000 to 1200 rpm, for clutch movement. In this example, the ECA 160 will monitor the rotational speed of the engine output shaft 50 (which is also the rotational speed of the shaft 74) while controlling the movement of the ECA 160 such that the clutch 24 is engaged at 1200 rpm and disengaged at 1000 rpm.

Further, a portion of the clutch 24 may be moved proportional to the change in magnitude of the engine speed. That is, a portion of the clutch 24 that moves as the clutch 24 is engaged may move a distance in a manner that is directly proportional to the change in magnitude of the engine speed in the preselected range. In the exemplary embodiment, the engine 22 is coupled to the clutch 24 such that detecting the rotational speed of a portion of the clutch 24 will indicate the rotational speed of the engine 22. The method may then proceed to step 360.

In step 360, the ECA 160 may record the value of the engine 22 speed, as detected by the sensor 60 while the clutch 24 is disengaged to determine a value for the engine idle speed, if desired. The method may then return to step 300.

As described in the exemplary embodiment above, the engine 22 will be permitted to operate at idle speed (such as, for example, 1000 rpm) to prevent the engine from undesirably carrying a load at idle speed while automatically engaging with the transmission 28 to drive the vehicle 18 when the engine speed is increased. Although the operations described herein may not be desirable operations for extended use, the method described herein may permit the vehicle 18 to operate until the user can navigate the vehicle 18 to a location for repair.

In other exemplary embodiments, the engine output shaft speed sensor 60 will detect movement of the engine output shaft 50 and directly control the motor 204 of the ECA 160, or the ECU 32 may detect a fault and perform the functions of steps 320, 330, 340 and 350.

The ECA 160 may engage and disengage the clutch 24 without human intervention. That is, no individual human input is needed for the ECA 160 to engage or disengage the clutch 24, as the ECA 160, or other device, may automatically initiate the engagement or disengagement of the clutch 24 when a fault is detected.

Although the steps of the method of operating the system 20 are listed in a preferred order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

Generally, the clutch position will be detected as the motor 26 begins to rotate, or within some acceptable time after the motor 26 begins to rotate. Since the detected clutch position corresponds to the complete disengagement of the clutch (no torque is transferred), then the detected clutch position may be used as a starting point for a controlled (slow) engagement of the clutch after the clutch has been brought to the detected clutch position in a relatively fast manner.

A Controller Area Network (CAN or CAN-bus) is a computer network protocol and bus standard designed to allow microcontrollers and devices to communicate with each other and without a host computer, such as an SAE J-1939 link.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular exemplary embodiment disclosed as the best mode contemplated for carrying out this invention, but that the invention will include all exemplary embodiments falling within the scope of the claims. The invention may be practiced otherwise than is specifically explained and illustrated without departing from its spirit or scope. The scope of the invention is limited solely by the following claims.

What is claimed is:

1. A method of engaging a clutch within a drive train comprising:
   detecting a fault in a clutch engagement data link;
   selecting an alternative clutch control logic;
   detecting a value indicative of a rotational speed of a first portion of the clutch, wherein the first portion of the clutch includes a plurality of recesses and a load transferring member retained there between, such that rotation of the first portion of the clutch causes movement of the load transferring member with respect to the recesses; and
   moving a second portion of the clutch based upon the detected value wherein the second portion of the clutch is moved proportional to a change in a magnitude of the detected value for a preselected range of the detected value.

2. The method of claim 1, further comprising recording a value indicative of an engine idle speed.

3. The method of claim 2, wherein the value indicative of an engine idle speed is recorded in an electric clutch actuator.

4. The method of claim 1, wherein detecting the value indicative of a rotational speed of the first portion of the clutch includes detecting the rotational speed of an engine.

5. The method of claim 1, further comprising preventing an engine from being rotationally coupled to a transmission when the rotational speed of the engine is at or below a preselected idle speed.

6. The method of claim 1, wherein moving the second portion of the clutch includes engaging the clutch.

7. The method of claim 1, wherein moving the second portion of the clutch includes disengaging the clutch.

8. The method of claim 1, wherein detecting a fault in a clutch engagement data link includes detecting a fault in a controlled area network data bus.

9. The method of claim 1, wherein movement of the load transferring member with respect to the recesses translates the second portion of the clutch.

10. The method of claim 1, wherein an engine output shaft sensor is used to detect the value indicative of the rotational speed of the first portion of the clutch.

11. The method of claim 1, wherein rotating the first member causes the transferring member to rotate with respect to at least one of the plurality of recesses, translating the second member.

12. The method of claim 11, wherein the plurality of recesses and the load transferring member are configured to prevent self-engagement of the clutch.

13. The method of claim 1, wherein the plurality of recesses include unidirectionally ramped recesses defining a cupped end.

14. A method of engaging a clutch within a drive train comprising:
   detecting a fault in a controlled area network data bus;
   selecting an alternative clutch control logic;
   detecting a value indicative of a rotational speed of a first portion of the clutch, wherein the first portion of the clutch includes a plurality of recesses and a load transferring member retained there between, such that rotation of the first portion of the clutch causes movement of the load transferring member with respect to the recesses; and
   moving a second portion of the clutch with a clutch actuator while the detected value is within a preselected range wherein the second portion of the clutch is moved proportional to a change in a magnitude of the detected value.

15. The method of claim 14, wherein moving the second portion of the clutch includes disengaging the clutch.

16. The method of claim 14, wherein detecting the value indicative of a rotational speed of the first portion of the clutch includes detecting the rotational speed of an engine.

17. The method of claim 14, further comprising not moving the second portion of the clutch with a clutch actuator while the detected value is not within the preselected range.

18. The method of claim 14, further comprising recording a value indicative of an engine idle speed.

19. The method of claim 18, wherein the value indicative of an engine idle speed is recorded in an electric clutch actuator.

20. The method of claim 14, further comprising preventing an engine from being rotationally coupled to a transmission when the rotational speed of the engine is at or below a preselected idle speed.

* * * * *